(12) United States Patent
Hrovat et al.

(10) Patent No.: US 8,502,009 B2
(45) Date of Patent: Aug. 6, 2013

(54) MATRIX MATERIAL COMPRISING GRAPHITE AND AN INORGANIC BINDER SUITED FOR FINAL DISPOSAL OF RADIOACTIVE WASTE, A PROCESS FOR PRODUCING THE SAME AND ITS PROCESSING AND USE

(75) Inventors: Milan Hrovat, Rodenbach (DE);
Karl-Heinz Grosse, Gruendau (DE);
Richard Seemann, Hanau (DE)

(73) Assignee: ALD Vacuum Technologies GmbH, Hanau (DE)

(*) Notice: Subject to any disclaimer, the term of this patent is extended or adjusted under 35 U.S.C. 154(b) by 175 days.

(21) Appl. No.: 12/626,721

(22) Filed: Nov. 27, 2009

(65) Prior Publication Data

US 2010/0167905 A1 Jul. 1, 2010

(30) Foreign Application Priority Data

Nov. 26, 2008 (DE) .......................... 10 2008 044 089
Mar. 30, 2009 (DE) .......................... 10 2009 001 977

(51) Int. Cl.
| G21F 9/00 | (2006.01) |
| G21F 9/16 | (2006.01) |
| C09K 3/00 | (2006.01) |
| C09K 11/04 | (2006.01) |
| B01J 20/20 | (2006.01) |
| C01B 31/08 | (2006.01) |

(52) U.S. Cl.
USPC .............. 588/11; 588/12; 588/14; 252/625; 502/413; 502/416

(58) Field of Classification Search
USPC ........... 502/400, 407–413, 416; 422/311.11; 423/448, 249–261; 588/2, 15, 16, 252, 10–12, 588/14; 252/625, 634
See application file for complete search history.

(56) References Cited

U.S. PATENT DOCUMENTS

| 3,624,005 | A | | 11/1971 | Godron |
| 3,719,608 | A | * | 3/1973 | Olstowski .................... 252/506 |
| 4,274,976 | A | | 6/1981 | Ringwood |
| 4,395,367 | A | | 7/1983 | Rohrmann et al. |
| 4,407,742 | A | | 10/1983 | Hrovat et al. |
| 4,560,502 | A | | 12/1985 | Hackstein et al. |
| 4,600,610 | A | | 7/1986 | Hrovat et al. |
| 5,288,429 | A | * | 2/1994 | von Bonin et al. ......... 252/378 R |
| 5,660,624 | A | * | 8/1997 | Dry ............................... 106/677 |

FOREIGN PATENT DOCUMENTS

| DE | 1421850 A1 * | 11/1968 |
| DE | 29 17 437 A1 | 11/1980 |
| DE | 3103557 A1 | 12/1982 |
| DE | 31 44 754 A1 | 5/1983 |
| DE | 31 44 755 A1 | 5/1983 |
| DE | 31 44 764 A1 | 5/1983 |
| DE | 32 37 163 A1 | 4/1984 |
| DE | 198 37 989 A1 | 3/2000 |

(Continued)

OTHER PUBLICATIONS

Rudisill, T. S., "Immobilization of Rocky Flats Graphite Fines Residue" DOE Publication WSRC-TR-98-00380. Feb. 1999.*

(Continued)

Primary Examiner — Anthony J Zimmer
(74) Attorney, Agent, or Firm — Dickstein Shapiro LLP

(57) ABSTRACT

A matrix material for safe temporary and/or ultimate disposal of radioactive wastes suitable for the embedment of radioactive wastes, contains graphite and at least inorganic binder which can be glass, aluminosilicate, silicate, borate and lead sulfide.

14 Claims, 1 Drawing Sheet examples of molded bodies with different embedded radioactive wastes

FOREIGN PATENT DOCUMENTS

| | | | |
|---|---|---|---|
| EP | 81084 A1 | * | 6/1983 |
| FR | 2 550 879 A1 | | 2/1985 |
| JP | 62-284298 A | | 12/1987 |

OTHER PUBLICATIONS

Charles W. Forsberg; "Disposal of Partitioning-Transmutation Wastes With Seperate Management of High-Heat Radionuclides"; Disposal of Partitioning-Transmutation for Economic Co-Operation and Development Nuclear Energy Agend, Paris, 2002, pp. 245-254.

D.P. Stintion at al.; "Coating of Crystalline Nuclear Waste Forms to Improve Inertness"; ORNL Report, Aug. 1982, pp. 394-398.

Hrovat, Milan et al.; "Highly Dense Graphite Matrix: A New Material For The Conditioning of Radioactive Wastes"; Nuclear Technology, vol. 61, Jun. 1983, pp. 460-464.

* cited by examiner

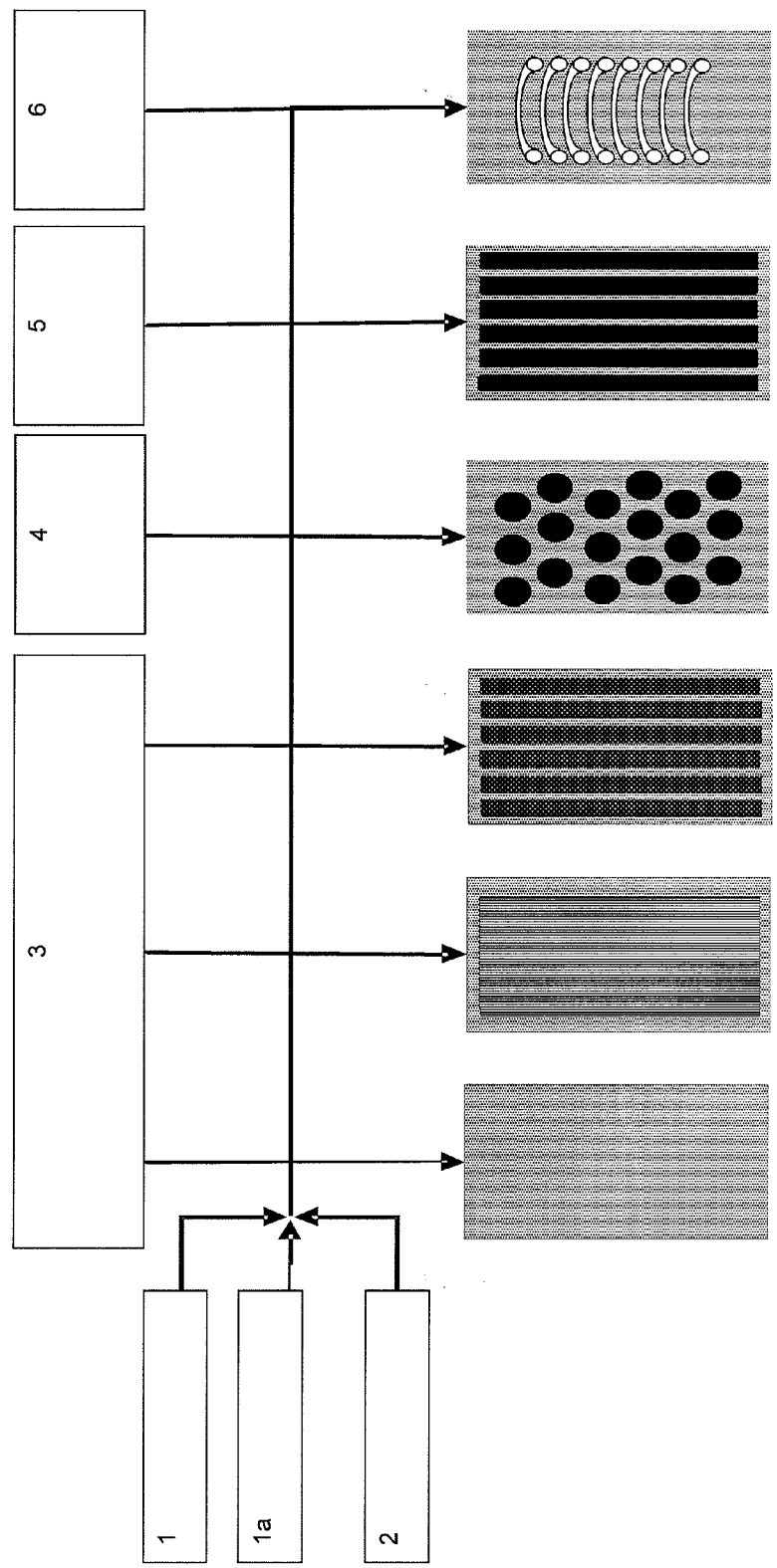

MATRIX MATERIAL COMPRISING GRAPHITE AND AN INORGANIC BINDER SUITED FOR FINAL DISPOSAL OF RADIOACTIVE WASTE, A PROCESS FOR PRODUCING THE SAME AND ITS PROCESSING AND USE

The present invention relates to a matrix material which is suitable for the safe ultimate disposal of radioactive wastes due to its particular constitution. The invention also relates to a method for producing and processing of such matrix materials as well as their use.

For example, radioactive wastes may be spent nuclear fuel elements (BE) from nuclear power plants and the produced wastes of nuclear fuel reprocessing, and also occurring radioactive substances resulting from retreat working of nuclear plants or from handling of radioactive substances in nuclear technology, medicine and industry which cannot be used any longer.

With the nuclear fuel reprocessing of spent nuclear fuel elements from e.g. a light water reactor (LWR) or a heavy water reactor (SWR) having a power of 1000 MWe, 750 kg of waste with high level radioactivity accrue every year. After the nuclear fuel reprocessing the waste is in the form of a liquid and is preferably converted into a solid form by calcination. Moreover, the decay heat and the half life periods of the corresponding fission products differ from each other by several decimal powers.

For conditioning and storage of radioactive wastes e.g. from operation of nuclear power plants or research institutions a series of methods have been developed which are used today in different forms. Conditioning of radioactive wastes means that the radioactive wastes are converted into a form which is suitable for ultimate disposal. There are different methods to package the radioactive waste with insignificant development of heat in a safe way and to fulfill the conditions of ultimate disposal. For example, the radioactive wastes may be converted into so-called coated particles or glass beads of borosilicate glass. Nevertheless, these conditioned radioactive wastes have to be disposed under ultimately safe conditions, so that for example no radionuclides can be released into the biosphere by leaching and migration.

Preferably, the technique of the method of vitrification is used for waste with high level radioactivity after nuclear fuel reprocessing of spent nuclear fuel rods. This mixture of glass and waste is introduced into particular metallic containers and provided for long term storage according to the state of the art of today.

Furthermore, spent nuclear fuel elements are also introduced into particular metallic containers for long term storage without any nuclear fuel reprocessing.

The problem with these containers is the fact that all metallic materials known up to now have an expected maximum of corrosion resistance of 10,000 years and thus a safe entombment of the radioactive wastes cannot be achieved. It is known that the fission products have much longer half life periods than the physical life of materials known up to now. In addition, there are influences such as fluctuations of the pH value which may lead to corrosion of the container materials and thus to leaching of the waste package which is an enormous risk for a leakage of radioactive fission products. Thus, the requirements for safe ultimate disposal are not fulfilled.

Till today, the use of non-metallic materials for a container has not been suggested due to different facts such as for example insufficient corrosion and leaching resistance, insufficient physical strength, a porosity which is too high.

Also materials of graphite and organic binders have disadvantages. The binders are responsible for the bonding of the individual components during the production process. But afterwards, the introduced binders have to be removed from the materials, because otherwise, when they stay back, they may impair the properties of the product produced, because the organic binder will be impaired by radioactive radiation and partly decomposed into gaseous components which subsequently escape from the material. Partly these gaseous decomposition products are combustible and are thus a potential risk for ultimate disposal. In this case, unfortunately pores are generated which considerably deteriorate the corrosion and leaching resistance of the product.

Patent DE 29 17437 C2 of the year 1979 describes a method of embedding of solid radioactive and toxic wastes into a graphite matrix of natural graphite with sulfur or a metal sulfide as a binder, wherein only nickel sulfide is mentioned as a binder.

The laid open publication of the patent application DE 31 44754 A1 of the year 1983 describes the production of a molded body of graphite and an inorganic binder for safe long time embedment of radioactive wastes. Primarily this publication relates to the production of a molded body of such a mixed material, wherein the binder is limited to metal sulfides which are primarily limited to nickel sulfide. A disadvantage compared to the present invention is the fact that nickel sulfide is indeed hardly soluble in water but the solubility in acidic media increases significantly which calls its suitability as an embedment material for ultimate disposal into question.

Patent DE 31 44755 C2 of the year 1984 describes a molded body of graphite and nickel sulfide for embedment of spent nuclear fuel rods and a method for its production.

The same applies to materials which comprise graphite and a binder. Embedding of HLW simulats (high level waste simulats) into a matrix of graphite and nickel sulfide is described in the publication of M. Hrovat et al. "Highly Dense Graphite Matrix: New Materials of the Conditioning of Radioactive Waste", Nuclear Technology, Vol. 61, June 1983, pages 460 to 464. The disadvantage of a matrix of graphite and nickel sulfide is in particular the pH value dependent stability of the material. The respective corrosion value measured in saturated brine with 0.1 m HCl at room temperature is more than one decimal power higher than the value measured at 100° C. without an addition of HCl.

The laid open publication DE 31 44764 A1 of the year 1981 describes a molded body for embedment of radioactive wastes and its production using nickel sulfide in the form of $Ni_3S_2$ as a binder for graphite.

Patent DE 32 37163 C2 of the year 1982 describes a material of construction containing 20-80% by weight of metal sulfide and carbon for the use of the production of prefabricated parts having good slip properties.

U.S. Pat. No. 4,274,976 describes a method for embedding radioactive waste into a crystal structure of oxides which should lead to demobilization of the waste due to their lattice distance. In this case, the compaction of the material to molded bodies with required density was very difficult.

U.S. Pat. No. 3,624,005 of the year 1962 describes a material of graphite and glass which is used for the production of brushes for electric motors and graphite bearings. Besides the already mentioned uses of these materials, an important content of this invention is also the machinability and polishability thereof as well as the good wear resistance and the low frictional constant. These are properties which are not of interest for the present invention. The material described in this invention cannot provide sufficient protection against penetration of aquatic phases due to the porosity at graphite contents of higher than 60% by weight.

One of the most important requirements for ultimate disposal of radioactive waste, for example waste with high level radioactivity (high level waste=HLW), is the safe embedment of the waste over geological periods of time. Desirable are periods of time of up to 1 mio years or longer. This requirement cannot be fulfilled by any method of ultimate disposal known up to now. The same applies to the respective materials.

Thus it is the object of the present invention to provide a matrix material which is suitable for safe embedment and ultimate disposal of radioactive wastes.

The object is achieved by a matrix material for safe temporary and/or ultimate disposal of radioactive wastes which is suitable for ultimate disposal of radioactive wastes, characterized in that the matrix material comprises graphite and an inorganic binder, selected from glasses, aluminosilicates and/or silicates and/or borates and/or lead sulfides.

Preferably, the inorganic binder is a glass, more preferably used as glass powder. Alternatively, the inorganic binder may also be a silicate, aluminosilicate, borate or lead sulfide.

A further advantage of this graphite-based matrix is its high thermal conductivity, high hardness/physical strength and relatively low thermal expansion as well as the extremely low tendency to crack initiation.

As already mentioned above, suitable as an inorganic binder are glasses, aluminosilicates and silicates or borates and lead sulfide. Aluminosilicates means minerals and chemical compounds of the group of silicates which are constituted of base units of tetrahedra of $SiO_4$ and tetrahedra of $AlO_4$.

Preferable embodiments of the present invention comprise glasses as an inorganic binder, more preferable a borosilicate glass. The advantage of borosilicate glasses is good corrosion stability. Borosilicate glasses are glasses with good chemical and temperature resistance. The good chemical resistance, for example against water, many chemicals and pharmaceutical products, can be explained by the boron content of the glasses. The temperature resistance and the insensitiveness of the borosilicate glasses against abrupt fluctuations of temperature are the result of the low coefficient of thermal expansion of about $3.3 \times 10^{-6}$ $K^{-1}$ of borosilicate glass. Common borosilicate glasses at the application date are for example Jeaner Glas, Duran®, Pyrex®, Ilmabor®, Simax®, Solidex® and Fiolax®. Without any problem a person skilled in the art will select a suitable borosilicate glass.

It is favourable that the inorganic binder is present in an amount of up to 40% by weight, based on the total amount of the matrix material. Furthermore, the amount of the inorganic binder is preferably 10 to 30% by weight and more preferably 15 to 25% by weight.

Preferably, the inorganic binder is a graphite wetting material in the softened or rather molten state, because in this case the voids between the graphite particles can be closed of its own volition by capillary forces and adhesive forces, respectively, without the need of an exterior pressure for compaction.

If in this specification and in the claims radioactive waste or radioactive wastes are mentioned, these terms describe all kinds of radioactive waste. Thus, these terms do not only relate to wastes with high level radioactivity but also to wastes with low level radioactivity and wastes with medium level radioactivity.

For example, the radioactive waste may be present as
coated waste particles,
glass beads loaded with waste,
calcined radioactive powder,
spent nuclear fuel element balls,
radioactive waste in the form of powder and/or segments of prismatic nuclear fuel elements or reflector blocks,
spent LWR (light water reactor) and/or SWR (heavy water reactor) nuclear fuel rods,
insoluble radioactive residue (feed sludge) from the dissolution of nuclear fuel elements This list is only exemplary and not exhaustive.

The particular inorganic binders according to the present invention in contrast to conventional binders have the advantage that during the heat treatment the respectively used binder does not form gaseous crack products which lead to the formation of pores in the matrix. This means that the inorganic binders according to the present invention are not part of reaction processes and thus no pores are formed. The respectively used inorganic binder according to the present invention has the additional advantage that it closes pores which nevertheless might be formed, leading to the high densities and good corrosion resistance.

The dissipation of decay heat of the radionuclides is remarkably improved by the embedment of the radioactive waste into the matrix material according to the present invention due to the high thermal conductivity of the matrix material.

Furthermore, the matrix material is an excellent corrosion and leaching resistant barrier. The corrosion rate based on the surface of the matrix material at 95° C. in a brine rich in magnesium chloride[1] is lower than $2 \times 10^{-4}$ $g/m^2d$, more preferably lower than $2 \times 10^{-5}$ $g/m^2d$ and particularly preferably even lower than $2 \times 10^{-6}$ $g/m^2d$. One liter of brine for the measurement of the corrosion rate consists of 937.1 g $MgCl_2*6H_2O$, 0.13 g $MgSO_4*7H_2O$, 4.13 g NaCl, 1.42 g KCl and 39.68 g $CaCl_2*2H_2O$ dissolved in deionized water. The corrosion rate at 95° C. is determined as follows: a molded body being manufactured from the matrix material having the dimensions of 10*10*10 mm is immersed into 100 ml of brine in a plastic beaker. During this measurement the molded body hangs on a twine so that no surface area comes in contact with the beaker. After 3 months or rather one year the weight of the molded body is determined with an accuracy of 0.1 mg and with the weight loss the corrosion rate based on the surface is determined. Alternatively the leached silicium content in the brine and thus also the corrosion rate of the glass should be determined.

[1]Brine 2 according to "Stellugnahme des Arbeitskreis HAW-Produkte: Korrosionsexperimente and verglasten Abfällen, Salzlösungen zu S/V-Verhältnis; 1986"

According to the present invention it is preferred that the matrix material comprises 60% by weight to 90% by weight of graphite and 10% by weight to 40% by weight of inorganic binder, wherein the density of the matrix material achieves at least 95% of the value of the theoretical densitiy. Preferably a densitiy of at least 97%, ideally of more than 99% of the theoretical density is achieved.

According to the present invention it is prefered that the matrix material has an open porosity of less than 5%, more preferable of less than 2%.

In the present specification the term density and theoretical density, respectively, is used as a synonym for the property of the material of not containing pores. The theoretical density means the density which can be calculated from e.g. X-ray geographic data (molar mass, number of formula units per unit cell, volume of unit cell). It is important that the matrix material has high density so that for example no humidity can penetrate into the matrix material. In the present invention the hydraulic conductivity of the matrix material should be $<1\times10^{-9}$ m$^2$/sec. Furthermore, due its dense structure the matrix material prevents the penetration of for example aquatic phases into the material.

The term porosity is a physical value and is the ratio of the volume of voids to the total volume of a substance or substance mixture. The porosity is a classified proportion for voids which are actually present.

It is preferred that the graphite in the matrix material according to the present invention consists of 20% by weight to 100% by weight of natural graphite and 0% by weight to 80% by weight of synthetic graphite.

It is further prefered that the graphite mixture in the matrix material according to the present invention consists of 60 to 100% by weight of natural graphite and 0 to 40% by weight of synthetic graphite. The synthetic graphite may also be called graphitized electric powder (electrographite). According to the present invention it is particularly preferred that the graphite in the matrix material according to the present invention comprises a portion of natural graphite. Natural graphite has the advantage that it is cheap, that the graphite grain has no micro-cracks in contrast to synthetic graphite and that in addition, for example, it can be easily compressed into molded bodies having nearly theoretical density.

It is further preferred that the graphite is natural graphite or synthetic graphite or a mixture of both components.

The synthetic or natural graphite which is contained in the matrix may be present as non-irradiated and/or irradiated and/or radioactively contaminated graphite. The glass used may also contain radioactive components.

In addition an auxiliary press material may be mixed into the matrix material.

In this case the following compositions of matrix components are used:

| Natural graphite [% by weight] | Synthetic graphite [% by weight] | Inorganic binder [% by weight] | Auxiliary press material |
|---|---|---|---|
| 70-90 | | 30-10 | No |
| 0-70 | 80-10 | 10-30 | No |
| | 70-90 | 30-10 | Yes |
| 70-90 | | 30-10 | Yes |
| 0-70 | 80-10 | 10-30 | Yes |

As auxiliary press material at higher temperatures in vacuum volatile waxes or alcohols having high molecular weight are used which allow sufficient green compact stability but are completely removed from the molded body during the sintering process so that its portion has not to be considered in calculating the matrix components.

In an intermediate step a molded body having cavities is prepared by a preforming pressing process depending on the mode of production and the waste to be embedded. The production of the final molded body is achieved either by cold isostatic pressing, followed by a vacuum sintering process, optionally with a subsequent isostatic compaction under high inert gas pressure, by hot isostatic pressing oder by means of hot-pressing in vacuum.

A homogenized mixture of the matrix components is used for all production processes, wherein an additional precompaction of the matrix material in the form of a granulate is an advantage for the pressing of the molded body.

The embedment of powdery radioactive wastes, in particular the embedment of radioactive graphite may be conducted by direct mixing with the non-radioactive matrix components which are not radioactive, wherein these may optionally only be glass powder. In this case it is an advantage to press the mixture in cold state to a molded body and subsequently to press such a molded body once again additionally with an outer cover of matrix material without mixed radioactive wastes to an assembled molded body or to press the matrix material mixed with radioactive wastes into a cavity of a cold pressed molded body without radioactive components so that the outer wall of the final highly compacted molded body does not contain radioactive materials.

For the embedment of radioactive wastes in the form of larger geometric bodies (see FIG. 1) a molded body having respective cavities is preformed and the cavities are uniformly completely filled with the waste particles and matrix material prior to the pressing process.

Examples of possible wastes to be embedded are:
HTR nuclear fuel element balls
segments, parts or granulate of prismatic HTR nuclear fuel elements (HTR=high temperature reactors)
glass beads loaded with radioactive waste
coated particles of HTR nuclear fuel elements
nuclear fuel elements of material test reactors and segments of nuclear fuel elements of material test reactors, respectively
cladding waste of nuclear fuel elements from nuclear fuel reprocessing
LWR/SWR nuclear fuel element rods
segments of internals of reactor cores
calcined HLW powder
insoluble radioactive residue ("feed sludge") from the dissolution of nuclear fuel elements From the matrix material preferably molded bodies are produced into which preferably radioactive wastes are embedded.

Production Example of a Molded Body of a Mixture of Glass/Graphite

Example 1

Natural graphite having an average particle size of ca. 30 μm was mixed with 20% of borosilicate glass (company Schott 8250™) having an average particle size of ca. 30 μm to a homogenous powder. This powder mixture was precompacted in a compactor (Pharmapaktor® L 200/50 P of the company Hosokawa Bepex). The Pharmapaktor is equipped with briquetting rolls for briquetting dimensions of 11×11 mm and a cylindric/cone-shaped precompaction screw. The briquette weight of the thus produced pellets was ca. 0.7 g with a briquette density of 1.64 g/cm$^3$. Subsequently the pellets were granulated in a screen-type mill. In the screen-type mill a strainer having a mesh size of 3.15 mm is installed. After comminution approximately the following bulk densities were yielded:
Granulate: 0.8 to 3.15 mm→986 g/l
0 to 3.15 mm→1,030 g/l
The yield of granulate was 49%.

The granulate thus prepared was subsequently compacted in a hot press in vacuum ($p_{abs}$<10 mbar) at a temperature of ca. 1050° C. with a pressing force of 200 kN.

The molded body thus produced has a diameter of 80 mm and a height of ca. 50 mm. The density of the molded body is 2.21 g/cm$^3$ and thus is near the theoretical density of single crystal of graphite which is 2.26 g/cm$^3$ which means a nearly pore-free structure. From the molded body polished specimens were prepared which did not show any visible pores under observation with an optical microscope as well as an scanning electron microscope.

Material characteristics:

| Compressive strength: | | 52-71 N/mm² |
|---|---|---|
| Rockwell hardness HR15Y: | ∥ | 92.2 |
| | ⊥ | 87.8 |
| Spec. elec. resistance: | ∥ | $3.1 \pm 0.2 \cdot 10^{-5}$ Ωm |
| | ⊥ | $1.8 \pm 0.2 \cdot 10^{-5}$ Ωm |

An investigation by means of mercury porosimetry has not shown any open macro or micro porosity. Also pictures of a scanning electron microscope are unsuggestive of the presence of pores.

Example 2

A mixture of one part of synthetic graphite (Graptech Grade CS) and four parts of natural graphite having average particle sizes of ca. 30 μm was mixed with 20% of borosilicate glass (company Schott 8330™) having an average particle size of ca. 300 μm to a homogenous powder and was precompacted and granulated as in example 1. Granulate: 0.8-3.15 mm→932 g/l or 0-3.15 mm→954 g/l, respectively.

The yield of granulate was 49%.

Subsequently the granulate thus prepared was compacted in a hot press in vacuum ($p_{abs}$~250 mbar) at a temperature of ca. 1250° C. with a pressing force of 200 kN.

The molded body thus prepared has a diameter of 80 mm and a height of ca. 25 mm. The density of the molded body is 2.13 g/cm³ and thus shows a density which is slightly lower than the density of the molded body of example 1. Nevertheless, a molded body of graphite having such a density also means a nearly pore-free structure. An investigation of pictures of polished specimens by means of optical microscopy identifies the use of coarser glass particles as the reason for lower density.

Example of Use

Example 1

Embedment of Radioactive Graphic (see FIG. 1)

For this purpose as a matrix material the irradiated graphite is used directly or in mixture with natural graphite. First, the present irradiated graphite waste is ground and screened to produce a powder having an average corn size of 10 to 50 μm, preferably 25 μm. Subsequently the powdery components of the irradiated graphite and glass powder, optionally with an addition of natural graphite, are mixed to a homogenous powder and this mixture is granulated. From this granulate at room temperature compacted briquettes are produced which have such a green strength that these compacted briquettes can be handled. At the same time a matrix mixture of not contaminated synthetic graphite, optionally in admixture with natural graphite, and glass is prepared and also processed into granulate. From this second granulate at room temperature a block having one or more cavities is produced, the green strength of which is also such that this molded body can be handled. In this case the cavity/cavities is/are formed so that they can house the prior produced compacted briquettes which are contaminated with the irradiated material. Then these compacted briquettes are inserted into the cavities of the block and the provided head space in the cavities is filled with non-irradiated granulate. Subsequently, the pressing of this block which has been assembled in such a way is completed at a temperature of 1000° C. to final density under vacuum in a tool which is suitable for that and after cooling to 250° C. it is ejected.

Example 2

Embedment of Spent LWR Nuclear Fuel Elements
(see FIG. 1)

Spent nuclear fuel rods from light water reactors (LWR) without nuclear fuel reprocessing are embedded into the matrix material of natural graphite and/or synthetic graphite and glass.

The nuclear fuel rods are coiled in spiral form and embedded at room temperature into the granulate of the matrix material which has been produced before by pressing in layers. Subsequently, the thus assembled block as described in example 1 is pressed with this matrix material to a homogenous molded body.

Example 3

Embedment of Spent HTR Nuclear Fuel Element Balls (see FIG. 1)

Spent nuclear fuel element balls from high temperature reactors (HTR) are embedded into the matrix material. At first, the graphite powder and the glass powder (see production of molded bodies, example 1) are mixed and processed to pressing granulate. The nuclear fuel element balls are inserted into this granulate in a staggered arrangement in layers and built into a block by precompaction of the single layers. Subsequently, this assembled block as described in example 1 is pressed with this matrix material to a homogenous molded body.

DESCRIPTION OF DRAWINGS

Drawing/FIG. 1 describes examples of molded bodies of natural graphite 1 and/or synthetic graphite 1a and/or binder 2, in which different kinds of radioactive wastes 3 to 6 are embedded.

LIST OF REFERENCE SIGNS

1=natural graphite
1a=synthetic graphite
2=binder
3=I-graphite, powdered or granulated, calcined HLW, powdered or granulated glass beads
4=HTR BE balls
5=prismatic HTR BE segments
6=rolled LWR BE

The invention claimed is:

1. A matrix material for safe temporary and/or ultimate disposal of radioactive wastes which is suitable for the embedment of radioactive wastes, characterized in that the matrix material comprises graphite and at least an inorganic binder which is a glass, wherein a radioactive material is present in addition to the matrix material and wherein the portion of graphite is 60% to 90% by weight based on the total amount of the matrix material.

2. The matrix material according to claim 1, wherein the glass is borosilicate glass.

3. The matrix material according to claim 1, wherein the portion of the inorganic binder is up to 40% by weight, based on the total amount of the matrix material.

4. The matrix material according to claim 1, wherein the portion of the inorganic binder is 10 to 30% by weight, based on the total amount of the matrix material.

5. The matrix material according to claim 1, wherein the portion of the inorganic binder is 15 to 25% by weight, based on the total amount of the matrix material.

6. The matrix material according to claim 1, wherein the graphite is natural graphite or synthetic graphite or a mixture of both components.

7. The matrix material according to claim 1, wherein the graphite is a mixture of 20 to 100% by weight of natural graphite and 0 to 80% by weight of synthetic graphite.

8. The matrix material according to claim 1, wherein the graphite is a mixture of 60 to 100% by weight of natural graphite and 0 to 40% by weight of synthetic graphite.

9. The matrix material according to claim 1, wherein the graphite comprises non-irradiated, irradiated and radioactively contaminated graphite.

10. The matrix material according to claim 1, wherein in addition an auxiliary press material is present in the matrix material.

11. The matrix material according to claim 1, wherein at least one of carbon and graphite in the form of fibers is present in the matrix material.

12. The matrix material according to claim 1, wherein the graphite content is 80% to 90% by weight based on the total amount of the matrix material.

13. The matrix material according to claim 1, wherein the matrix has a density of more than 99% of the theoretical density.

14. The matrix material according to claim 1, wherein the radioactive material is embedded in the matrix material.

* * * * *